US005293465A

United States Patent [19]

Abumehdi et al.

[11] Patent Number: 5,293,465

[45] Date of Patent: Mar. 8, 1994

[54] FRANKING MACHINE WITH DIGITAL PRINTER

[75] Inventors: Cyrus Abumehdi, Harlow; Raymond J. Herbert, Leigh-on-Sea, both of United Kingdom

[73] Assignee: Neopost Limited, Romford, United Kingdom

[21] Appl. No.: 909,753

[22] Filed: Jul. 7, 1992

[30] Foreign Application Priority Data

Jul. 8, 1991 [GB] United Kingdom ................. 9114694

[51] Int. Cl.⁵ ............................................. G06F 15/00

[52] U.S. Cl. ...................................... 395/113; 380/51

[58] Field of Search ............... 395/101, 113, 114, 117; 380/21, 23, 51; 364/464.01, 464.02; 400/104, 61

[56] References Cited

U.S. PATENT DOCUMENTS 4,934,846 6/1990 Gilham .......................... 364/464.02

5,121,432 6/1992 Gilham et al. ...................... 395/113

*Primary Examiner*—Arthur G. Evans

*Attorney, Agent, or Firm*—Shoemaker and Mattare, Ltd.

[57] ABSTRACT

A franking machine is disclosed in which a digital printing device such as a thermal printer or ink jet printer is connected to accounting circuits of the franking machine so as to be controlled thereby to print franking impressions. In order to prevent unauthorised control of the printing device by application of external print signals, print data signals output by the accounting circuit are encrypted by logically combining the signals with pseudo random strings of binary bits. At the printing device the encrypted print data signals are decrypted by logically combining the encrypted print data signals with a corresponding pseudo random string of binary bits to provide print signals to control the printing device. Connections between the decryption circuit and the print head are protected from unauthorised access.

16 Claims, 2 Drawing Sheets

FRANKING MACHINE WITH DIGITAL PRINTER

BACKGROUND OF THE INVENTION

This invention relates to franking machines in which a digital printing device is utilised to print a franking impression and in particular to providing security for print data signals which control operation of the printing device.

In known franking machines which are currently in use for franking mail items to indicate that postage charges in respect of those items has been accounted for, the printing of the franking impression is carried out by means of a print drum which carries a print die to print the fixed pattern of the impression and carries print wheels to print variable information. The variable information includes the value of the postage charge for the item and the date of franking the item. The print wheels each have a series of type characters on the periphery thereof and are settable to locate a selected one of the characters in an operative printing position whereby printing of the desired postage charge and date is effected. The print wheels are set to the required positions by mechanisms operated either directly by value setting levers or thumb wheels operated by a user of the franking machine or by stepper motors controlled by electrical drive signals in dependence upon positioning of thumb wheels or operation of keys of a keyboard by a user of the machine. The positions of the levers or thumb wheels are sensed by encoders to provide electrical signals representing a selected postage value to electronic accounting circuits to enable accounting functions to be performed in relation to the selected postage value. In franking machines having a postage meter which operates in a pre-payment mode, a descending register in the meter stores a value of credit available for use in franking mail items with postage charge values and each time a mail item is franked the credit value in the descending register is decremented by the amount of the postage charge value for that item. The postage meter also includes an ascending register to store an accumulated value of postage charge used by the meter in franking mail items and is incremented by the value of postage charge as each item is franked. A further register stores a count of the number of items franked by the machine and is incremented by one each time an item is franked. Accordingly the accounting information stored in the registers provides a record of the postage used in franking mail items and the amount of credit which remains available for use in franking mail items. As is well known in franking machines the electronic accounting circuits are housed in a secure housing to inhibit unauthorised and fraudulent attempts to tamper with the accounting data and with operation of the postage meter. While the surface of the print drum and the selected type characters of the print wheels are exposed, the mechanisms for setting the print wheels are contained within the print drum and extend through an arbour for the drum into the secure housing of the meter. Accordingly the setting mechanisms are protected from unauthorised tampering and the setting mechanisms are so constructed as to prevent changing of the setting of the print wheels by applying force directly to the print wheels. Thus the known mechanical printing devices used in franking machines prevent unauthorised re-setting of the printing elements.

In franking machines currently being developed, it is desired to use non-mechanical digital printing devices such as ink jet print heads or thermal print heads operated directly by electrical signals which define the information both fixed and variable to be printed by the printing device to constitute the franking impression. Such printing heads need to be connected by electrical conductors to the accounting and control circuits of the franking machine in order to receive the electrical signals which are to control and selectively operate the print head. Accordingly it is necessary to prevent unauthorised application of electrical signals on these connecting conductors or to a print data signal input of the printing device resulting in operation of the printing device to print a franking impression.

SUMMARY OF THE INVENTION

According to the invention a franking machine includes electronic accounting and control circuits and a digital printing device operable by print data signals comprising binary bits generated by the accounting and control circuits to print franking impressions including a representation of a postage charge means to transmit the print data signals from the accounting and control circuits to the digital printing device including encryption means at the accounting and control circuits comprising a first generator to generate a first pseudo random string of binary bits and means to logically combine successive bits of the first pseudo random string with bits of the print data signals to produce encrypted print data signals and decryption means at the printing device comprising a second generator to generate a second pseudo random string of binary bits corresponding to said first pseudo random string of binary bits and means to combine successive bits of the second pseudo random string of binary bits with bits of the encrypted print data signals to reproduce the bits of the print data signals to operate the printing device.

BRIEF DESCRIPTION OF THE DRAWING

An embodiment of the invention will now be described by way of example with reference to the drawings in which.

DESCRIPTION OF THE PREFERRED EMBODIMENT

Figure 1:
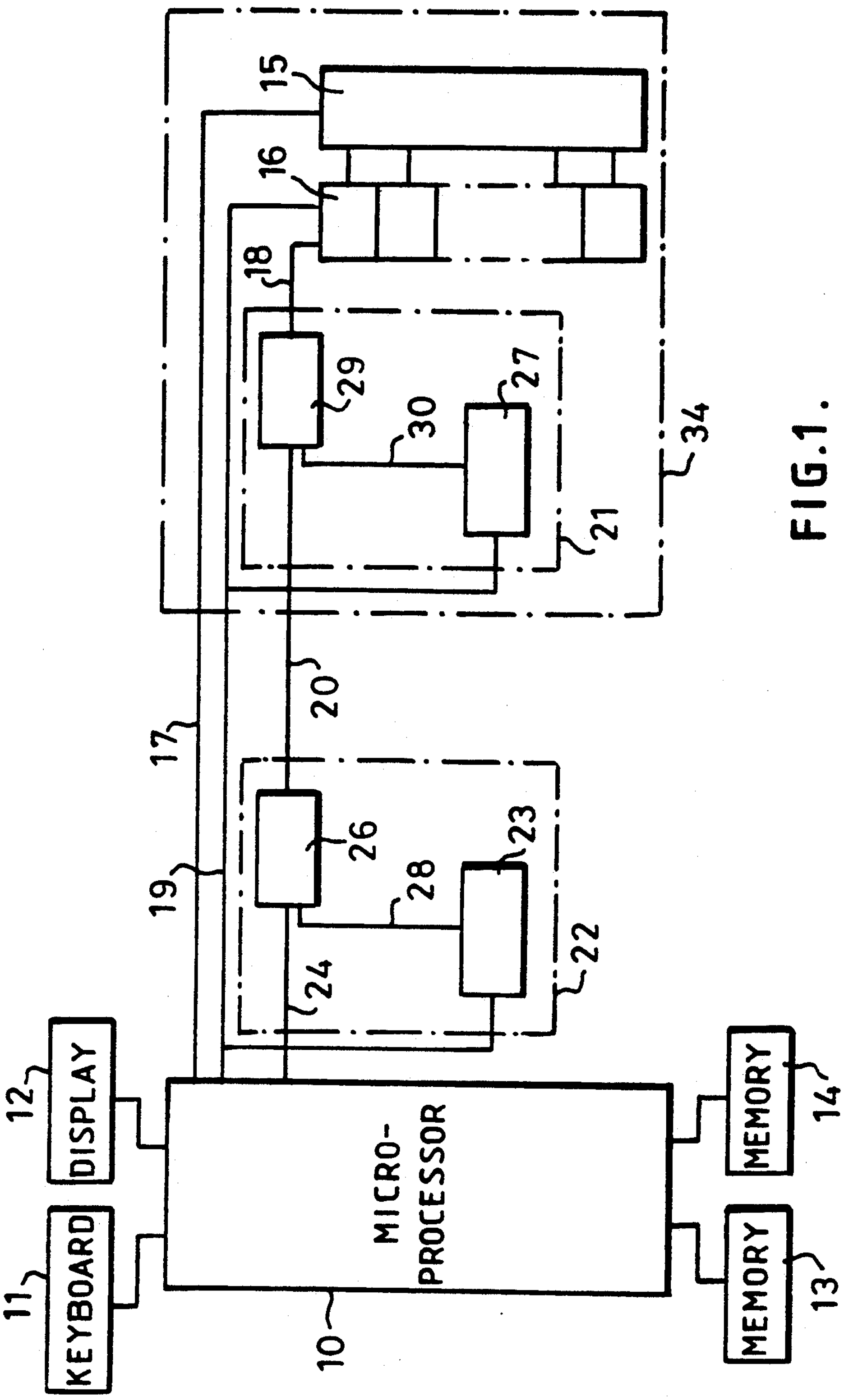
FIG. 1 is a block diagram of electronic accounting and control circuits and a digital printing device of a franking machine in which signals for controlling the printing device are transmitted serially.

Referring to FIG. 1 of the drawing, electronic accounting and control circuits for a franking machine are constituted in well known manner by a microprocessor 10 to which required command signals and postage value signals are input by means of keyboard 11. A display device 12 is provided for the display of information to a user of the franking machine. Non-volatile memory devices 13, 14 are provided for the storage of accounting data. Each memory 13, 14 includes a descending register for storing a value of credit available for use in franking of mail items, an ascending tote register for storing an accumulated value of postage used in franking mail items by the franking machine, an items count register for storing a count of the number of items franked and a high items register to store a count of the number of items franked with a postage charge in excess of a predetermined value. The registers are duplicated in each of the memory devices 13, 14 in order to enable verification of the integrity of stored accounting data.

A digital printing device 34 is provided for printing franking impressions on mail items. The printing device comprises a print head 15 having a plurality of print elements arranged in a line and which can be selectively operated to print a plurality of dots in each of a plurality of print cycles to build up a franking impression line by line in successive print cycles. The print elements may be ink jet devices or thermal print elements of a thermal print head. However other forms of printing device in which elements are operated selectively by means of a string of print data signals may be used. The print elements are connected to corresponding memory locations of a print buffer register 16 into which a string of print data bits is entered serially. The bits of the print data string represent a dot pattern to be printed in a line by the print elements in a single print cycle and for example a binary one may represent a dot to be printed and a binary zero may represent a space in which a dot is not to be printed. When the string of print data has been entered into the buffer register 16, a strobe signal on a line 17 causes operation of the print elements in dependence upon the binary values in the memory locations of the buffer register corresponding to the print elements. The strings of print data signals are input serially to the buffer register 16 on line 18 and are clocked into the register by means of clock signals received from the microprocessor 10 on line 19.

It will be appreciated that unauthorised printing of a franking impression could be effected by applying appropriate strings of print signals to the line 18 while the print elements are strobed by strobe signals on line 17. In order to prevent such unauthorised operation of the printing device the print data signals output by the microprocessor 10 are encrypted prior to transmission to the printing device. The encrypted print data signals are carried by a line 20 and are input to a decryption circuit 21 of the printing device. Decrypted print data signals output from the decryption circuit 21 are input to the print buffer register 16 on line 18. The line 18 connecting the output of the decryption circuit 21 to the input of the buffer register is securely protected to prevent unauthorised application of signals to the input of the buffer register. Accordingly the encryption circuit is mounted in close proximity to the buffer register so that the connection 18 therebetween is as short as is practicable and preferably is encapsulated.

Where practical, the encryption circuit 21 may be physically bonded to the buffer register 16 by encapsulation therewith.

The print data signals output by the microprocessor 10 on line 24 are encrypted by an encryption circuit 22 by logically combining the string of print data signals with the output 28 from a pseudo random signal generator 23. The output 28 of the generator 23 comprises a pseudo random string of binary bits and this is combined in a gate 26 with a string of print data signals output by the microprocessor 10 to produce a corresponding string of encrypted print data signals output from the gate 26 onto line 20. The encrypted print data signals are decrypted by means of the decryption circuit 21 which is identical to the encryption circuit 22 and comprises a pseudo random signal generator 27. The pseudo random string of binary bits output on connection 30 from the generator 27 is combined in a gate 29 with the string of encrypted print data signals received on line 20 to produce at the output of the gate 29 on connection 18 a string of decrypted print data signals corresponding to those output by the microprocessor on line 24 to the encryption circuit 22.

It will be understood that the pseudo random generators 23, 27 are maintained in synchronism by clock signals on the line 19. While the pseudo random generators may be clocked at the bit rate of the print data stream as shown in the drawing, if desired the pseudo random generators may be clocked by clock signals at a rate which is a fraction of the bit rate at which the print data signals are clocked so that each bit from the pseudo random generators of the encryption circuit and decryption circuit would be combined with a number, greater than one, of print data signals in succession.

The encryption circuit 22 may be constituted by circuit components specifically provided to carry out this function as described hereinbefore or if desired the encryption of the print data signals may be effected by the microprocessor 10 operating under a program routine to emulate the operation of such a specific encryption circuit.

Accordingly it will be understood that the print data signals are encrypted and the encrypted print data signals are decrypted by logically combining corresponding pseudo random strings of binary bits with the strings of print data signals and encrypted print data signals respectively, the pseudo random strings of bits being maintained in synchronism with each other.

Figure 2:
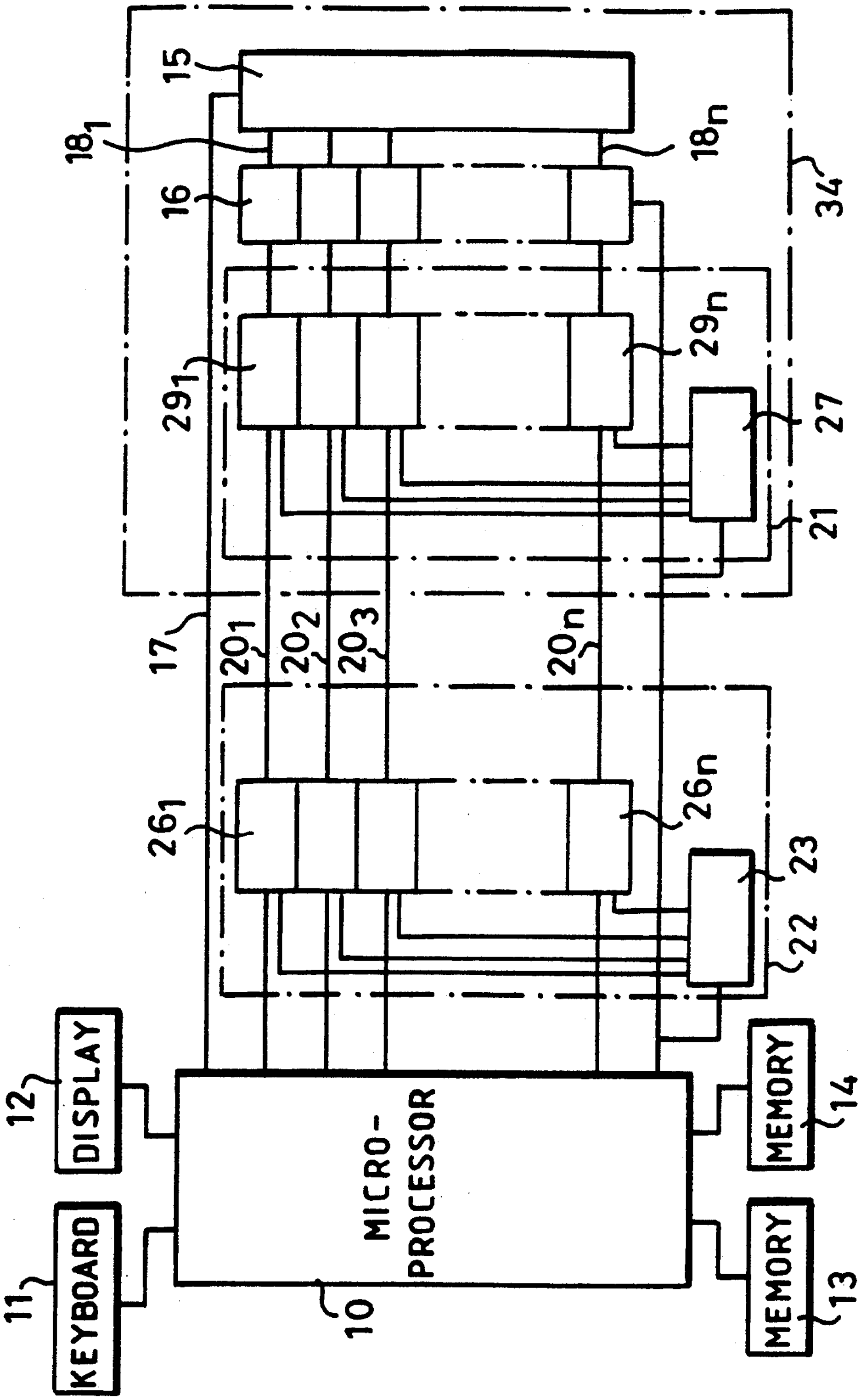
FIG. 2 is a similar block diagram in which signals for controlling the printing device are transmitted in parallel.

While hereinbefore there has been described a franking machine in which a single serial string of print data signals is output by the accounting and control microprocessor 10 on a single line 24, it is to be understood that the invention may also be utilised to encrypt and decrypt print data signals which are output in parallel on a plurality of lines $24_1$-$24_n$ as shown in FIG. 2. Successive bits of print data on each line are logically combined in a plurality of gates $26_1$-$26_n$, one for each line $24_1$-$24_n$, with successive bits of the pseudo-random string of bits from the generator 23 to produce encrypted parallel print data bits on parallel lines $20_1$-$20_n$. These encrypted data bits output from the gates are transmitted by means of the plurality of lines to one input of a plurality of gates $29_1$-$29_n$ respectively at the printing device 34. The other inputs of the gates $29_1$-$29_n$ at the printing device receive the pseudo random string of bits from generator 27 to decrypt the encrypted print data signals into print data signals which are input in parallel on lines $18_1$-$18_n$ to the buffer store 16 of the printing head. The same pseudo random string of bits from generator 23 may be input in common to all the gates $26_1$-$26_n$ and similarly the same pseudo random string of bits from generator 27 is input in common to all the gates $29_1$-$29_n$. However if desired different pseudo random strings may be input to the gates provided that corresponding gates $26_1$-$26_n$ and $29_1$-$29_n$ receive the same pseudo random strings. That is to say gates $26_1$ and $29_1$ receive the same pseudo random strings, gates $26_2$ and $29_2$ receive the same pseudo random strings and so on. It will be understood that, in a similar manner to the secure protection of the single connection 18 of the serial embodiment shown in FIG. 1, the plurality of connections $18_1$-$18_n$ of the embodiment shown in FIG. 2 are securely protected from unauthorised access.

The term digital printer used hereinbefore is to be understood to include not only printing devices such as ink jet and thermal printers in which dots are printed selectively at selected positions on mail items to build up required printed impressions but also other forms of printing device in which impressions or visual patterns are formed on mail items by selective operation of a plurality of elements. The operation of the elements may produce dots or other shaped patterns and may for example produce segments of characters required to be formed on the mail items.

We claim:

1. A franking machine including electronic accounting and control circuits and a digital printing device operable by print data signals comprising binary bits generated by the accounting and control circuits to print franking impressions including a representation of a postage charge means to transmit the print data signals from the accounting and control circuits to the digital printing device including encryption means at the accounting and control circuits comprising a first generator to generate a first pseudo random string of binary bits and means to logically combine successive bits of the first pseudo random string with bits of the print data signals to produce encrypted print data signals and decryption means at the printing device comprising a second generator to generate a second pseudo random string of binary bits corresponding to said first pseudo random string of binary bits and means to logically combine successive bits of the second pseudo random string of binary bits with bits of the encrypted print data signals to reproduce the bits of the print data signals to operate the printing device.

2. A franking machine as claimed in claim 1 including an electrical connection connecting an output of the decryption means to the printing device wherein said electrical connection is securely protected to inhibit unauthorised access thereto.

3. A franking machine as claimed in claim 2 wherein the decryption means and the printing device are constructed to inhibit direct access to the electrical connection.

4. A franking machine as claimed in claim 1 wherein the logical combination of the print data signals with the pseudo random string of binary bits in the encryption means is effected by a first logic gate.

5. A franking machine as claimed in claim 4 wherein the logical combination of the encrypted print data signals with the second pseudo random string of binary bits in the decryption means is effected by means of a second logic gate.

6. A franking machine as claimed in claim 1 wherein the accounting and control circuits include a microprocessor operating under control of a program routine to generate the first pseudo random string of binary bits and to logically combine the binary bits of said pseudo random string with binary bits of the print data signals.

7. A franking machine as claimed in claim 1 wherein the print data signals comprise a plurality of bits in parallel.

8. A franking machine as claimed in claim 7 wherein the encryption means logically combines parallel bits of the print data signals with the bits of the first pseudo-random string to produce parallel bits of the encrypted data signals and wherein the decryption means logically combines the parallel bits of the encrypted data signals with the bits of the second pseudo-random string.

9. A franking machine including electronic accounting and control circuits and a digital printing device comprising a plurality of print elements; said plurality of print elements being operable in each of a succession of print cycles by a string of print data binary bits corresponding to said respective print elements and generated by said accounting and control circuits to print in said succession of print cycles a franking impression including a representation of postage information; transmission means to transmit said string of print data bits from said accounting and control circuits to said digital printing device including encryption means at the accounting and control circuits comprising a first generator to generate a first pseudo random string of binary bits corresponding respectively to said string of print data bits and first means to logically combine successive bits of the first pseudo random string with corresponding bits of said string of print data binary bits to produce a string of encrypted print data bits and decryption means at said printing device comprising a second generator to generate a second pseudo random string of binary bits corresponding to said first pseudo random string of binary bits and second means to combine successive bits of the second pseudo random string of binary bits with corresponding bits of said string of encrypted print bits thereby to reproduce said string of print data binary bits to operate said print elements of said printing device.

10. A franking machine as claimed in claim 9 wherein the decryption means includes a print data bit output for the print data binary bits and including an electrical connection connecting said print data bit output to the printing device and means to securely protect said electrical connection to inhibit unauthorised access to said electrical connection.

11. A franking machine as claimed in claim 9 including a first logic gate; said first logic gate including a first input to receive the string of print data binary bits, a second input to receive the first pseudo random string of binary bits and a first output; and first logic gate being operative to logically combine the binary bits of said first pseudo random string of binary bits with corresponding bits of said string of print data binary bits to produce at said first output the string of encrypted print data bits.

12. A franking machine as claimed in claim 11 including a second logic gate; said second logic gate including a second output connected to the print data bit output, a third input to receive the string of encrypted print data bits and a fourth input to receive the second pseudo random string of binary bits; and said second logic gate being operative to logically combine the binary bits of the second pseudo random string of binary bits with corresponding bits of the string of encrypted print bits to reproduce at said first print data bit output said string of print data bits.

13. A franking machine as claimed in claim 9 wherein the accounting and control circuits comprise a microprocessor operating under control of a program routine to generate the first pseudo random string of binary bits.

14. A franking machine including electronic accounting and control circuits and a digital printing device comprising a plurality of print elements; said plurality of print elements being operable in each of a succession of print cycles by a like plurality of binary print data bits corresponding to said plurality of print elements and generated by said accounting and control circuits to print in said succession of print cycles a franking impression including a representation of postage information; transmission means to transmit said print data bits from said accounting and control circuits to said digital printing device including encryption means at the accounting and control circuits comprising a first generator to generate a plurality of pseudo random first binary bits and first means to logically combine said pseudo random first binary bits respectively one with each of said print data binary bits to produce a plurality of encrypted print data bits and decryption means at said printing device comprising a second generator to generate a plurality of pseudo random second binary bits corresponding to said plurality of pseudo random first binary bits and second means to logically combine said pseudo random second binary bits respectively one with each of said encrypted print data bits thereby to reproduce said plurality of print data bits to operate said elements of said digital printing device.

15. A franking machine as claimed in claim 14 including a plurality of first logic gates; said first logic gates each including a first input to receive the print data binary bits, a second input to receive the first pseudo random binary bits and a first output; and said first logic gates being operative to logically combine the binary bits of said plurality of first pseudo random binary bits with corresponding bits of said print data binary bits to produce at said first outputs the plurality of encrypted print data bits.

16. A franking machine as claimed in claim 15 including a plurality of second logic gates; said second logic gates each including a second output, a third input to receive the encrypted print data bits and a fourth input to receive the second pseudo random binary bits; and said second logic gates being operative to logically combine said second pseudo random binary bits with corresponding bits of the plurality of encrypted print data bits to reproduce at the second outputs of said plurality of second logic gates the plurality of print data bits.

* * * * *